(12) United States Patent
Ritter et al.

(10) Patent No.: US 6,959,450 B1
(45) Date of Patent: Oct. 25, 2005

(54) TRANSMISSION AND DISPLAY OF VIDEO DATA

(75) Inventors: Rudolf Ritter, Zollikofen (CH); Eric Lauper, Bern (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 09/926,780

(22) PCT Filed: Jun. 18, 1999

(86) PCT No.: PCT/CH99/00267

§ 371 (c)(1),
(2), (4) Date: Dec. 18, 2001

(87) PCT Pub. No.: WO00/79759

PCT Pub. Date: Dec. 28, 2000

(51) Int. Cl.[7] .............................................. H04N 7/173
(52) U.S. Cl. ....................... 725/133; 348/103; 382/103
(58) Field of Search ................................ 382/103, 107; 348/42, 43, 51, 53; 345/428, 619, 7–9, 32; 340/5.8–5.86; 351/209; 725/133, 141, 153

(56) References Cited

U.S. PATENT DOCUMENTS

| 4,513,317 A | * | 4/1985 | Ruoff, Jr. ............... 375/240.25 |
| 5,103,306 A | * | 4/1992 | Weiman et al. .......... 348/400.1 |
| 5,422,653 A | * | 6/1995 | Maguire, Jr. .................. 345/9 |
| 5,467,104 A | * | 11/1995 | Furness et al. ................ 345/8 |
| 5,528,677 A | * | 6/1996 | Butler et al. ................ 379/196 |
| 5,726,916 A | * | 3/1998 | Smyth ........................ 702/151 |
| 5,852,489 A | * | 12/1998 | Chen .......................... 351/237 |
| 6,163,336 A | * | 12/2000 | Richards ...................... 348/42 |
| 6,173,069 B1 | * | 1/2001 | Daly et al. ................... 382/118 |
| 6,373,961 B1 | * | 4/2002 | Richardson et al. ......... 382/103 |
| 6,454,411 B1 | * | 9/2002 | Trumbull ..................... 351/211 |
| 6,657,538 B1 | * | 12/2003 | Ritter ........................ 340/5.81 |
| 6,717,578 B1 | * | 4/2004 | Deering ....................... 345/428 |

FOREIGN PATENT DOCUMENTS

WO 94 09472 4/1994

* cited by examiner

Primary Examiner—Vivek Srivastava
(74) Attorney, Agent, or Firm—Oblon, Spivak, McClelland, Maier & Neustadt, P.C.

(57) ABSTRACT

A system (1) and a method for transmitting and presenting video data as well as a communications terminal (4) suitable therefor and a suitable video center (2), users being able to request and obtain video data from the video center (2) by means of communications terminals (4), in particular mobile communications terminals (4), over a telecommunications network (3), in particular a mobile radio network (3), picture signals corresponding to the received video data being projected upon the retina (51) of the user through a virtual retina display device (41) of the communications terminal (4), current eye positions of the user being determined in the communications terminal (4) and being transmitted to the video center (2), and the video center (2) comprising a video filter module which filters said video data, prior to their transmission, on the basis of received current eye positions such that outer image regions, corresponding to the video data, projected on the retina (51) outside the fovea (511) have a lesser resolution than the inner image areas, corresponding to the video data, projected on the fovea (511) of the retina (51), and the filtered video data accordingly contain a lesser quantity of data than the unfiltered video data.

16 Claims, 1 Drawing Sheet

TRANSMISSION AND DISPLAY OF VIDEO DATA

BACKGROUND OF THE INVENTION

1. Field of the Invention

This invention relates to a system and a method for transmitting and presenting video data as well as devices suitable therefor. In particular, this relates to a system and method for transmitting and presenting video data as well as devices suitable therefor according to the preamble of the respective independent claim 1, 7, 13 or 16.

2. Description of the Related Art

Especially with the spread of the Internet, it has become more and more popular to offer over the Internet video data, i.e. files with digital data that, with suitable playback means, can be presented to the user as moving pictures, to download them from the Internet, and show them on the screen of a personal computer, or store them in a data store of a personal computer. In order to reduce the required transmission times and storage capacities for the digital video data, the video data are typically stored and transmitted in compressed form, and are decompressed before or during playback. Various standards for storing, or respectively compressing/decompressing video data are already available, for example the various MPEG standards (Moving Picture Expert Group). Nevertheless the transmission times for video data are considered too slow by many users. Moreover, there are complaints that one is dependent upon a fixed-installed personal computer in particular during simultaneous download and visible reproduction of video data.

SUMMARY OF THE INVENTION

Described in the patent publication U.S. Pat. No. 4,513,317 is a system for recording and viewing video data in which both the television recording camera and the television video display can be operated with a selectable high or low resolution, i.e. with a switchable fine or coarse electron beam. With the television video display, according to U.S. Pat. No. 4,513,317, the line of sight of the viewer is tracked by means of an eye position tracking module, and the tracked line of sight is transmitted to the television recording camera. According to U.S. Pat. No. 4,513,317, the television recording camera is operated with high resolution, by means of a camera controller, in a predefined region around the focus upon which the line of sight falls, whereas the recording takes place with low resolution in the remaining areas. Regions with high resolution and regions with low resolution are shown by the television recording camera according to U.S. Pat. No. 4,513,317 with different voltage values. On the basis of these different voltage values, the video signals received by the television video display, according to U.S. Pat. No. 4,513,317, are correspondingly displayed with high or low resolution.

It is an object of this invention to propose a new and better system, a new and better method and suitable devices for transmitting and presenting video data which in particular make possible shorter transmission times during transmission over a telecommunications network.

This object is achieved according to the invention in particular through the elements of the independent claims. Further advantageous embodiments follow moreover from the dependent claims and from the description.

In the system for transmitting and presenting video data which includes a video center with a communications module as well as a telecommunications network with at least one communications terminal connected thereto, the video center being able to transmit by means of the communications module video data via the telecommunications network to a communications terminal, this communications terminal comprising at least one video display device that presents received video data to the user of the communications terminal in a visible way, and which includes an eye position tracking module that determines current eye positions of the user, and the communications terminal including an eye position feedback module that transmits the determined current eye positions to the video center, this object is achieved through the invention in particular by the video center including a database and/or a file server with digital video data, by the video display device being a virtual retinal display device (Virtual Retinal Display, VRD), which projects picture signals corresponding to the received video data onto the retina of the said user, and by the video center including a video filter module, which filters the video data, prior to their transmission, on the basis of received current eye positions such that outer picture regions, corresponding to the video data, which are projected onto the retina outside the fovea, have a lower resolution than inner picture regions, corresponding to the video data, which are projected on the fovea of the retina. Moreover the filtered video data therefore contain a lesser data quantity than the unfiltered video data. The advantage of this system and of the corresponding method consists in that a particular characteristic of the human eye, i.e. the fact that a small region of the retina having an optic angle of approximately 2°, the so-called fovea, has the sharpest vision, can be exploited in such a way that the quantity of data to be transmitted can be drastically reduced.

In an embodiment variant, the telecommunications network includes a mobile network, for instance a mobile radio network for mobile telephony, e.g. a GSM or UMTS network, and the communications terminals are mobile radio devices, for instance a mobile radio telephone or a communication-capable laptop or palmtop computer. This has the advantage that mobile users can obtain video data from the video center and view video data by means of the video display device of their mobile devices, the video center not having to be directly connected to the mobile network, but being able to be reached over the mobile network via suitable network units, such as, for example, a Mobile Switching Center (MSC) or a Short Message Service Center (SMSC).

In an embodiment variant, the video filter module has a cut-out function which filters out at least certain of the said video data corresponding to the above-mentioned outer picture regions so that the picture region corresponding to the filtered video data is a section from the picture region corresponding to the unfiltered video data, which section contains at least the inner picture region. This has the advantage that, in particular with a large total picture area, only those video data that are viewed by the user in detail have to be transmitted with a high resolution.

In an embodiment variant, the video center includes a prediction module which stores eye positions determined by the eye position tracking module, and which predicts a subsequent eye position on the basis of these stored eye positions. This has the advantage that the number of reports of eye positions to the video center, in particular with continuous change of the eye positions of the user, can be reduced, it being possible to increase it in the case of extreme change in eye positions, for example. In a further variant, the content of the video data can additionally be taken into consideration in the prediction of a subsequent eye position, so that the change in the eye position correlates with the movement of large and/or central objects, for instance.

In an embodiment variant, a correction module receives correction values from the user, stores received correction values, and corrects eye positions, determined by the eye position tracking module, with stored correction values. This has the advantage that the agreement of determined eye positions with the position of the fovea of the user can be adjusted by the user by entering the correction values such that the picture region with the highest resolution is actually projected on the fovea.

BRIEF DESCRIPTION OF THE DRAWING

A more complete appreciation of the present invention and many of the attendant advantages thereof will be readily obtained as the same becomes better understood by reference to the following detailed descriptions and accompanying drawing.

DETAILED DESCRIPTION OF THE PREFFERED EMBODIMENTS

Figure 1:
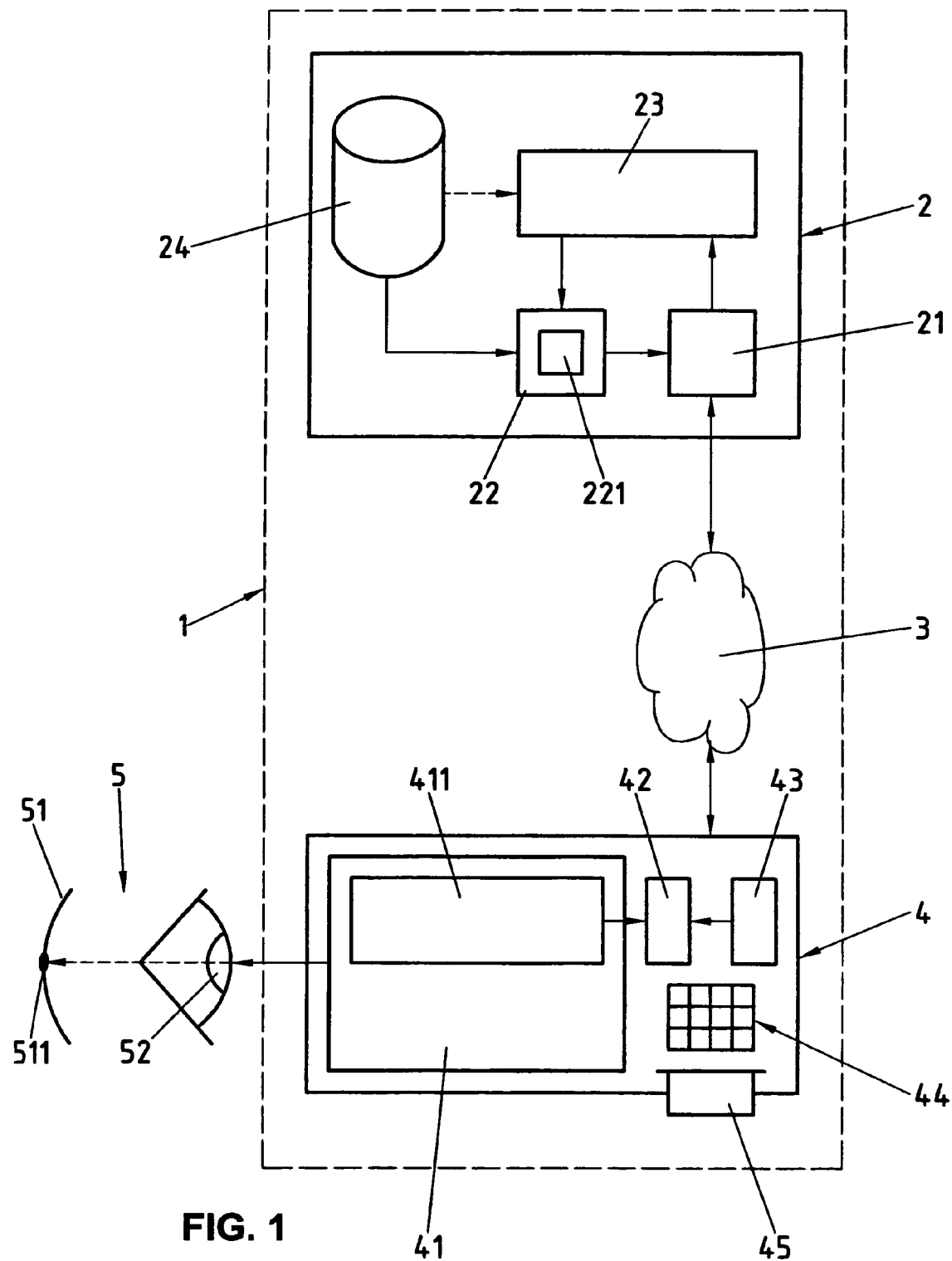
FIG. 1 shows a system for transmitting and presenting video data.

An embodiment of the present invention will be described in the following with reference to an example. The example of the embodiment is illustrated by the following single attached figure:

FIG. 1 shows a block diagram of the system, showing schematically a video center which is connected via a telecommunications network to a communications terminal including a video display device that projects video data onto the retina of an eye.

The reference numeral 1 in FIG. 1 relates to a system for transmitting and presenting video data, i.e. digital data files the content of which can be shown to an interested user as moving pictures using suitable reproduction means, in which system 1 these video data are obtained from a video center 2 and are transmitted over a telecommunications network 3 to a communications terminal 4, where, through a video display device 41 of the communications terminal 4, picture signals corresponding to the video data are projected onto the retina 51 of the eye 5 of the user of the communications terminal 4.

A video display device 41, which can project picture signals directly on the retina 51 of a viewer, a so-called virtual retinal display device (Virtual Retinal Display, VRD) has been described in the patent applications WO 94/09472 and WO 97/37339. Via a video data interface, these virtual retinal display devices can be supplied with video data, for example in the form of an RGB signal, an NTSC signal, a VGA signal or another formatted color or monochrome video or graphic signal. One skilled in the art will understand that it can be advantageous to adapt the virtual retinal display device described in the mentioned patent publications WO 94/09472 and WO 97/37339, or respectively the video data interface described there, in such a way that it is also able to receive efficiently other formats of television signals, and in particular digital video data. By means of an interface module (not shown), television signals and video data can also be suitably adapted to the video interface, however, or respectively received video data can be converted such that they are able to be applied to the video interface.

The video display device 41 and the further components of the communications terminal 4 can be implemented in a common or in separate housings, the video display device 41 being connected in a first housing via a wired or via a wireless interface to components in the second housing, for instance.

By means of this communications terminal 4, a user of the communications terminal 4 can request and obtain video data from the video center 2 over the telecommunications network 3. The video center 2 is based, for example, on a commercially available communications server having a communications module 21 with the necessary hardware and software components to communicate with communications terminals 2 over telecommunications networks 3. The telecommunications network 3 comprises, for example, a fixed network, for instance the public switched telephone network or a network based on the Internet Protocol (IP), and/or a mobile radio network, for example a GSM or UMTS network, with which mobile radio network the video center 2 is connected, for instance via network units (not shown), e.g. via a Mobile Switching Center (MSC) or a Short Message Service Center (SMSC). In the embodiment variant in which the telecommunications network 3 comprises a mobile radio network, at least certain of the communications terminals 4 are mobile radio devices, for example mobile radio telephones or communication-capable laptop or palmtop computers, which, for instance with the aid of SMS messages (Short Message Services), USSD messages (Unstructured Supplementary Services Data), GPRS services (Generalized Packet Radio Service) or according to a suitable protocol, are able to exchange data over the mobile radio network via the user information channel.

Selection commands and instructions, entered by the user of the communications terminal 4 by means of its operating elements 44 and transmitted to the video center 2 over the telecommunications network, are received there by the communications module 21 and further processed so that, for example, video data in a database 24 or from a file server of the video center 2 requested by the user are obtained and are transmitted over the telecommunications network 3 to the communications terminal 4 of the user. For example by means of a browser, for instance an Internet browser for direct access to the Internet or a browser based on WAP (Wireless Application Protocol), the user can look over the titles of available video data and request desired video data, and, for instance, pause, wind back or forwards, restart and terminate the transmission of the desired video data. The database 24, respectively the file server, can be implemented on a common computer together with other components of the video center 2 or on a separate computer. Depending upon the embodiment of the above-mentioned video data interface of the virtual retinal display device 41, the communications terminal 4 can include an interface module (mentioned above) (not shown), which interface module suitably adapts the video data received from the video center 2 to the video data interface, or respectively converts received video data such that they are able to be applied to the video data interface. A suitable adaptation of the video data for the video data interface of the virtual retinal display device can also take place in the video center 2.

As shown schematically in FIG. 1, the video display device 41 includes an eye position tracking module 411, which determines current eye positions of the viewer and is able to transmit them via the above-mentioned, or an additional, wired or wireless interface to an eye position feedback module 42 of the communications terminal 4. An eye position tracking module (eye tracker) which determines current eye positions based on the position of the pupil 52 of a viewer, has also been described in the above-mentioned patent application WO 94/09472, and can be extended by one skilled in the art such that the determined eye position is available for components outside the video display device 41 via a suitable interface; depending upon the embodiment, values for both eyes can be made available. The eye position feedback module 42 of the communications terminal 4, for example a programmed software module that is executed on a processor of the communications terminal 4, transmits determined current eye positions of the viewer over the telecommunications network 3, with the aid of communications services of the communications terminal 4, to the video center 2. The transmitted current eye positions are received in the video center 2 by the communications module 21, and are passed on to the video filter module 22.

In the video filter module 22, which can be executed as a programmed software module, for instance, and/or with a suitable signal processing processor, the video data to be transmitted are filtered on the basis of received, current eye positions of the respective user such that the outer picture regions, corresponding to the said video data, which are projected through the virtual retinal display device 41 onto the retina 51 of the user outside the fovea 511, have a lower resolution than inner picture regions, corresponding to these video data, that are projected on the fovea 511 of the retina 51. The particular characteristic of the human eye 5, i.e. the fact that a small region of the retina 51 having an optic angle of approximately 2°, the so-called fovea, has the sharpest vision, is thereby exploited such that only the picture areas that are actually projected on the fovea 511 are transmitted with their, possibly very detailed, high resolution whereas the resolution, or respectively the detailed content, of picture regions projected outside the fovea 511 are filtered, and the data quantity for filtered video data can thereby be drastically reduced in comparison to unfiltered video data.

In an embodiment variant, the video filter module 22 has a cut-out-function 221 that can filter video data such that certain picture regions, corresponding to the video data, are filtered out, based on current eye positions. Thus, for example, at least certain video data corresponding to a defined portion of the above-mentioned outer picture regions can be filtered out, so that the picture region corresponding to the filtered video data is a section of the picture region corresponding to the unfiltered video data, this section containing at least the above-mentioned inner picture region. In this way only those video data corresponding to picture regions viewed in detail by the user have to be transmitted, which, particularly in the case of large total picture areas, drastically reduces the data quantity to be transmitted for filtered video data compared to unfiltered video data.

When the filtered video data are transmitted from the video center 2 via the telecommunications network 3 to the communications terminal 4 and are projected there by the virtual retinal display device 41 onto the retina 51 of the respective user, the user can intervene in a correcting way if the inner picture region with high resolution, respectively with high detailed content, if applicable, is not projected on the fovea 511, i.e. if the projected picture is not perceived by the user as being projected in a sharp way. For this purpose, the communications terminal 4 includes a correction module 43, which is able to receive and store correction values, for instance horizontal and vertical distance indications, entered by the user, for example by means of the operating elements 44, for instance with left, right, up and down arrow keys, and which corrects the eye positions, determined by the eye position tracking module 411, with stored correction values before they are transmitted to the video center 2, so that the picture area with the highest resolution, and if applicable with the highest detail content, is actually projected on the fovea 511. Determined eye positions and the position of the fovea 511 of the user can thereby be brought into accord individually by the user, the individual correction values being stored, for example, on a chipcard 45 of the communications terminal 4, for instance an SIM card (Subscriber Identification Module), which can be removed from the communications terminal 4. The correction module 43 is, for example, a programmed software module which can be executed on a processor of the communications terminal 4, for instance a processor on a chipcard 45 of the communications terminal 4.

Current, if applicable corrected, eye positions received in the video center 2 can be stored there, for example by a prediction module 23. The prediction module, for instance a programmed software module, determines the next eye position to be expected from the series of previously stored current eye positions, for example by means of suitable regression functions. Particularly in the case of continual change in the eye positions of the user, the number of reports of eye positions by the communications terminal 4 to the video center 2 can thereby be reduced, for example. In order to transmit extreme changes in the eye positions immediately to the video center 2, the eye position feedback module 42 in the communications terminal 2 <sic. 4>, can detect, for instance, a sharp difference between a first determined eye position and the subsequent second determined eye position, can transmit this second determined eye position immediately to the video center 2, e.g. starting from a predefined threshold value. In predicting expected next eye positions, the prediction module 23 can additionally take into consideration the content of the respective video data, in a further variant, so that, for instance, the expected change in eye position correlates with the movement of large and/or central objects in the pictures corresponding to video data. To carry out this last variant, it can be advantageous, for example, to analyze respective video data in advance with suitable image processing means such that their pictorial content can be described in abstract form, for instance through object designations, vectors and/or data on coordinates. Such abstract content descriptions can be stored in the database 24, for instance together with the respective video data, and can be supplied to the prediction module 23.

A user can be charged for obtaining video information, e.g. directly against a prepaid monetary amount stored on the chipcard 5, through a bank account, by credit card or by invoice, for example as part of the telephone bill, the billing being per time unit of obtained video information, per obtained title and/or in combination with a subscription, for instance. The sale or leasing of described system components can also be of commercial interest, for example a complete communications terminal 4 as described, an expansion set with the necessary components to extend a conventional communications terminal into a described communications terminal 4, also comprising in particular a data carrier with programmed eye position feedback module 42 and correction module 43 stored thereon, or a data carrier with programmed communications module 21 stored thereon, video filter module 22 as well as prediction module 23 in order to operate a conventional communications server as the described video center 2, having the hardware components required by the communications module 21, as well as a video database 24 and/or a file server.

What is claimed is:

1. A system for transmitting and presenting video data, which system includes a video center with a communications module, which system includes a telecommunications network with at least one communications terminal connected thereto, the video center being set up to transmit the video data by means of the communications module via the telecommunications network to the communications terminal, the communications terminal comprising at least one display device which presents received video data to the user of the communications terminal in a visible way and which includes an eye position tracking module which determines current eye positions of the user, and the communications terminal including an eye position feedback module which transmits the determined actual eye positions to the video center, wherein the video display device is a virtual retinal display device which projects picture signals corresponding to the received video data onto the retina of the user, the video center includes a database and/or a file server in which the video data are stored in digital form, and the video center includes a video filter module, which filters the stored video data, prior to their transmission, on the basis of received current eye positions such that outer picture regions, corresponding to the video data, which are projected on the retina outside the fovea have a lower resolution than inner picture regions, corresponding to the video data, which are projected on the retina, and the filtered video data therefore contain a lesser quantity of data than the unfiltered video data.

2. The system according to claim 1, wherein the telecommunications network comprises a mobile network, and the communications terminal is a mobile radio device.

3. The system according to claim 1, wherein the video filter module has a cut-out function which filters out at least certain of the video data corresponding to the outer picture regions so that the picture region corresponding to the filtered video data is a section from the picture region corresponding to the unfiltered video data, which section contains at least the inner picture region.

4. The system according to claim 1, wherein the video center includes a prediction module, which stores eye positions determined by the eye position tracking module, and which predicts a subsequent eye position on the basis of these stored eye positions.

5. The system according to claim 4, wherein the prediction module predicts a subsequent eye position taking into consideration the video data.

6. The system according to claim 1, wherein it includes a correction module which receives correction values from the user, stores the received correction values, and corrects eye positions, determined by the eye position tracking module, with the stored correction values.

7. A method for transmitting and presenting video data in which method the video data are transmitted from a video center over a telecommunications network to a communications terminal and are presented there by a video display device in a visible way for the user of the communications terminal, current eye positions of the user being determined and the determined current eye positions being transmitted to the video center, wherein the video data are obtained from a database and/or from a file server of the video center, where the video data are stored in digital form, the video display device projects picture signals corresponding to the video data onto the retina of the user, and the video data are filtered in the video center, prior to their transmission, on the basis of received current eye positions such that outer picture regions, corresponding to the video data, which are projected on the retina outside the fovea have a lower resolution than inner picture regions, corresponding to the video data, which are projected on the fovea of the retina, and the filtered video data therefore contain a lesser quantity of data than the unfiltered video data.

8. The method according to claim 7, wherein the telecommunications network comprises a mobile network, and the communications terminal is a mobile radio device.

9. The method according to claim 7, wherein at least certain of the video data corresponding to the outer picture regions are filtered out so that the picture region corresponding to the filtered video data is a section from the picture region corresponding to the unfiltered video data, which section contains at least the inner picture region.

10. The method according to claim 7, wherein the determined eye positions are stored in the video center, and a subsequent eye position is predicted on the basis of these stored eye positions.

11. The method according to claim 10, wherein a subsequent eye position is predicted taking into consideration the video data.

12. The method according to claim 7, wherein correction values entered by the user are received, the received correction values are stored, and the determined eye positions are corrected with the stored correction values.

13. A video center which includes a communications module, which is set up to receive requests for video data from communications terminals over a telecommunications network and transmit requested video data to a respective communications terminal, wherein it includes a database and/or a file server in which the video data are stored in digital form, and it includes a video filter module which filters video data, prior to their transmission, on the basis of current eye positions of the user of the respective communications terminal, which eye positions are transmitted from the respective communications terminal to the video center, such that outer picture regions, corresponding to the video data, which are projected onto the retina outside the fovea, have a lower resolution than inner picture regions, corresponding to the video data, which are projected on the fovea of the retina, and the filtered video data therefore contain a lesser quantity of data than the unfiltered video data.

14. The video center according to claim 13, wherein the video filter module has a cut-out function which filters out at least certain of the video data corresponding to the outer picture regions so that the picture region corresponding to the filtered video data is a section from the picture region corresponding to the unfiltered video data, which section contains at least the inner picture region.

15. The video center according to claim 13, wherein it includes a prediction module which stores eye positions transmitted by the respective communications terminal, and which predicts a subsequent eye position on the basis of these stored eye positions.

16. The video center according to claim 15, wherein the prediction module predicts a subsequent eye position taking into consideration the video data.

* * * * *